(12) United States Patent
Song et al.

(10) Patent No.: US 8,944,703 B2
(45) Date of Patent: Feb. 3, 2015

(54) FIELD INSTALLABLE OPTICAL-FIBER CONNECTOR

(75) Inventors: Qixing Song, Shenzhen (CN); Shengen Ding, Shenzhen (CN)

(73) Assignee: Sunsea Telecommunications Co., Ltd., Nanshan District, Shenzhen, Guangdong (CN)

( * ) Notice: Subject to any disclaimer, the term of this patent is extended or adjusted under 35 U.S.C. 154(b) by 259 days.

(21) Appl. No.: 13/636,691

(22) PCT Filed: Mar. 24, 2010

(86) PCT No.: PCT/CN2010/071270
§ 371 (c)(1),
(2), (4) Date: Nov. 30, 2012

(87) PCT Pub. No.: WO2011/116521
PCT Pub. Date: Sep. 29, 2011

(65) Prior Publication Data
US 2013/0071070 A1    Mar. 21, 2013

(51) Int. Cl.
*G02B 6/36* (2006.01)
*G02B 6/38* (2006.01)

(52) U.S. Cl.
CPC ............ *G02B 6/3846* (2013.01); *G02B 6/3887* (2013.01)
USPC ....................................................... 385/83

(58) Field of Classification Search
USPC ........................................................ 385/83
See application file for complete search history.

(56) References Cited

U.S. PATENT DOCUMENTS

| 5,125,057 | A  | * | 6/1992  | Aberson et al. ................ 385/65 |
| 8,340,485 | B2 | * | 12/2012 | Danley et al. .................. 385/43 |
| 2008/0019646 | A1 | * | 1/2008 | deJong .......................... 385/99 |
| 2010/0303416 | A1 | * | 12/2010 | Danley et al. ................ 385/55 |
| 2013/0156384 | A1 | * | 6/2013  | Milette et al. ................ 385/81 |
| 2014/0037250 | A1 | * | 2/2014  | Treadwell et al. ............. 385/78 |
| 2014/0105552 | A1 | * | 4/2014  | Sun ............................. 385/97 |
| 2014/0153878 | A1 | * | 6/2014  | Mullaney ...................... 385/78 |
| 2014/0226936 | A1 | * | 8/2014  | Sun ............................. 385/81 |

* cited by examiner

*Primary Examiner* — Sung Pak
(74) *Attorney, Agent, or Firm* — Global IP Services; Tianhua Gu

(57) ABSTRACT

A field installable optical-fiber connector at least comprises an optical-fiber splice sleeve with a hole for optical-fiber ferrule and an optical-fiber splice member containing-chamber. A first half and a second half of the optical-fiber splice member are placed in the optical-fiber splice member containing-chamber. An optical-fiber ferrule pre-provided with the connecting optical-fiber is inserted in the hole for optical-fiber ferrule. The connecting optical-fiber is butt jointed with a field optical-fiber in an optical-fiber splice groove on the first half. The first half or the second half is provided with a rib which is matched with and protrudes from a locking slot of the optical-fiber splice sleeve. An optical-fiber splice member clamp, which covers the optical-fiber splice sleeve, is provided with a channel comprising an upper part and a lower part parallel with each other. The width of the lower part is larger than that of the upper part. When the optical-fiber splice sleeve is positioned in the upper part, the wall of the channel presses the rib, so that the connecting optical-fiber and the field optical-fiber are kept in the optical-fiber splice groove. The optical-fiber connector can perform a quick field installing and dismounting without external tools.

12 Claims, 4 Drawing Sheets

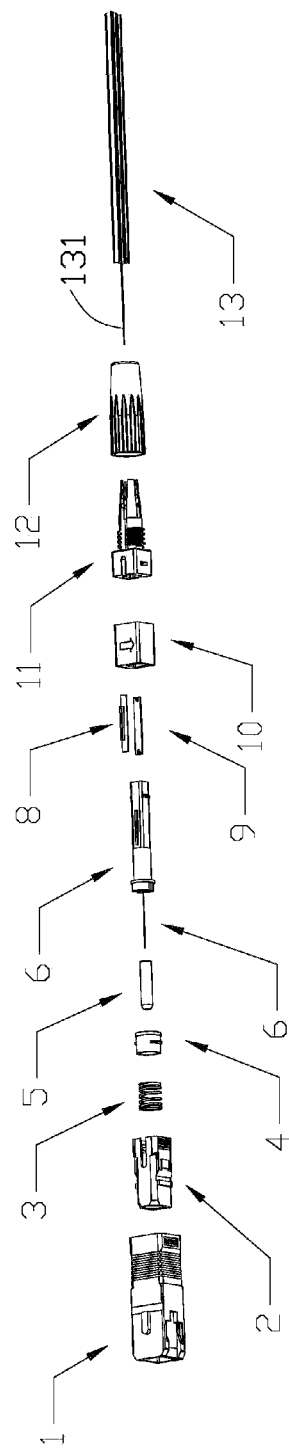
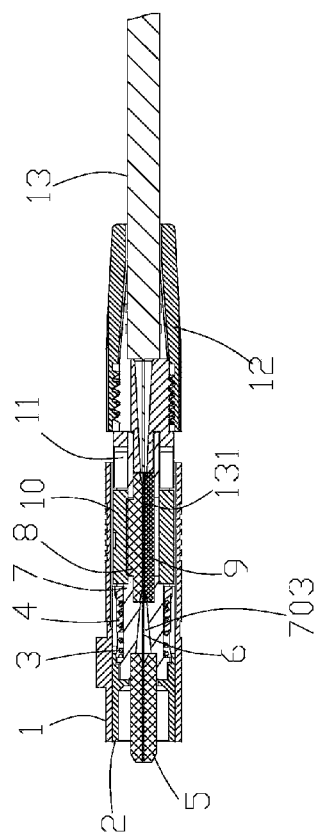
FIG. 1
FIG. 2

FIELD INSTALLABLE OPTICAL-FIBER CONNECTOR

CROSS REFERENCE TO RELATED PATENT APPLICATION

The present application is the US national stage of PCT/CN2010/071270 filed on Mar. 24, 2010, which claims the priority of the PCT/CN2010/071270 filed on Mar. 24, 2010, that application is incorporated herein by reference.

FIELD OF THE INVENTION

The present invention relates to an optical-fiber connector, and more particularly to a field installable optical-fiber connector.

BACKGROUND OF THE INVENTION

The development of FTTH (Fiber To The Home) extends the optical fiber to the user terminal. The user terminal has the most notable features of a huge amount, scattered distribution and low cost requirement. The existing optical-fiber connector is usually installed at the end of the optical fiber in the factory assembly process. The optical-fiber connector manufactured in the factory by the welding technology has high reliability and excellent optical property; however, the factory manufacture has a complex process, is time-consuming, needs the power supply for welding, needs to preheat the welding equipment, and has long-duration and complex operation. For a backbone network, a metropolitan area network, as well as a district level optical fiber access point, the construction condition is better because the optical fiber needs continuous point centralization and is mainly centralized in the machine room, thus resolving the power supply and preheating problem.

However, when having the problems of scattered and huge total amount of FTTH connection, the factory assembly of the optical-fiber connector will face a great challenge. For example, the optical-fiber connector is installed at the end of the optical fiber in the factory, and the optical fiber after connection, having a fixed length, needs excessive length and curl to ensure an enough length, but is still hard to cope with the complex field conditions. If the optical fiber is field installed, because of scattering and small amount of the connection point, inefficiency and high cost of the factory assembly process will limit application of the optical fiber.

Therefore, there also appear some field installable optical-fiber connectors, e.g. the American patent U.S. Pat. No. 5,040,867, and the Chinese patents ZL200580009235.6 and ZL200580041651.4, which disclose some field installable optical-fiber connectors and belong to the America Corning Cable Systems Co., Ltd. Although the optical-fiber connector disclosed by these patents is field installable, but still requires a special tool for the assembly, resulting in certain restrictions to the application.

CONTENTS OF THE INVENTION

A purpose of the present invention is to provide an optical-fiber connector that allows rapid field installation without an installation tool.

The technical solution the present invention adopts to resolve the technical problem is as below: A field installable optical-fiber connector is provided, at least comprising:

an optical-fiber splice sleeve, having a segment of quadrangular prism provided inside with an optical-fiber splice member containing-chamber, the quadrangular prism being provided at one of its sides with a locking slot running through the side where it is located and the inner surface of the optical-fiber splice member containing-chamber, the optical-fiber splice sleeve being provided at its end opposite to the quadrangular prism with a hole for optical-fiber ferrule, an optical-fiber channel being provided between the hole for optical-fiber ferrule and the optical-fiber splice member containing-chamber;

an optical-fiber splice member, placed in the optical-fiber splice member containing-chamber, including a first half or a second half opposite to each other, the first half being provided with a longitudinal optical-fiber splice groove, the first half or the second half being provided with a rib which is matched with and protrudes from the locking slot;

an optical-fiber ferrule, inserted in the hole for optical-fiber ferrule and pre-provided inside with a connecting optical-fiber, the connecting optical-fiber being located at one end inside the optical-fiber ferrule and at the other end into the optical-fiber splice groove through the optical-fiber channel, the field optical-fiber entering the optical-fiber splice groove from an opposite direction to be butt jointed with the connecting optical-fiber;

an optical-fiber splice member clamp, sleeved on the quadrangular prism, provided with a longitudinally extending locking channel including an upper part and a lower part parallel to each other, the lower part being wider than the upper part, an inner wall of the locking channel pressing the rib so that the connecting optical-fiber and the field optical-fiber are kept by the first half and the second half in the optical-fiber splice groove when the quadrangular prism is moved from the lower part to the upper part of the channel;

in the field installable optical-fiber of the present invention, the optical-fiber splice groove are provided at both ends with a guide slope, and the second half is provided with another guide slope at a position corresponding to the guide slope;

in the field installable optical-fiber of the present invention, the connector further includes a fixed tailstock detachably connected with the optical-fiber splice sleeve and used for fixing a field optical cable;

in the field installable optical-fiber of the present invention, the fixed tailstock includes a seat body and a tail sleeve, the seat body being provided with an optical-cable channel for connecting and fixing the field optical cable and with a splice portion detachably connected with the optical-fiber splice sleeve and a tapered portion provided with a compressed opening for clamping the field optical cable, the tapered portion compressed and clamping the field optical cable when the tail sleeve is sleeved on the tapered portion;

in the field installable optical-fiber of the present invention, the optical cable channel of the tapered portion is provided on its inner surface with a projection used for clamping the field optical cable;

in the field installable optical-fiber of the present invention, the optical-fiber splice sleeve is provided with an upside-down buckle, and the splice portion of the seat body is provided with a buckle matched with the upside-down buckle;

in the field installable optical-fiber of the present invention, the optical-fiber connector further includes a frame sleeve detachably connected with the optical-fiber splice sleeve, and an elastic module is provided between the frame sleeve and the optical-fiber splice sleeve;

in the field installable optical-fiber of the present invention, the elastic module includes a spring and a stop seat, the spring being sleeved on the optical-fiber splice sleeve provided with a spring seat matched with the spring, the stop seat being sleeved on the optical-fiber splice sleeve to limit the spring between the spring seat and the stop seat, the stop seat being clipped inside the frame sleeve to fix the optical-fiber splice sleeve inside the frame sleeve;

in the field installable optical-fiber of the present invention, the stop seat is provided with the upside-down buckle, and the frame sleeve is provided with a buckle matched with the upside-down buckle; and in the field installable optical-fiber of the present invention, the optical-fiber connector further includes a shell, which covers the frame sleeve and the optical-fiber splice member clamp.

The field installable optical-fiber connector of the present invention has the following advantages: In the field installable optical-fiber of the present invention, the optical-fiber splice member clamp has been placed in the optical-fiber connector, and can be used to lock the optical-fiber connector without the aid of an external tool; therefore, the optical-fiber connector allows rapid field installation without a special tool, very suitable for field installation.

BRIEF DESCRIPTIONS OF THE DRAWINGS

The present invention will further be described below with reference to drawings and examples.

FIG. 1 is an exploded three-dimensional drawing of the field installable optical-fiber connector.

FIG. 2 is a sectional view of the field installable optical-fiber connector.

DETAILED DESCRIPTION OF THE EMBODIMENTS

For more clear understanding of the technical features, purpose and effects of the present invention, the specific embodiments of the present invention will be described in detail with reference to the drawings.

Figure 15:
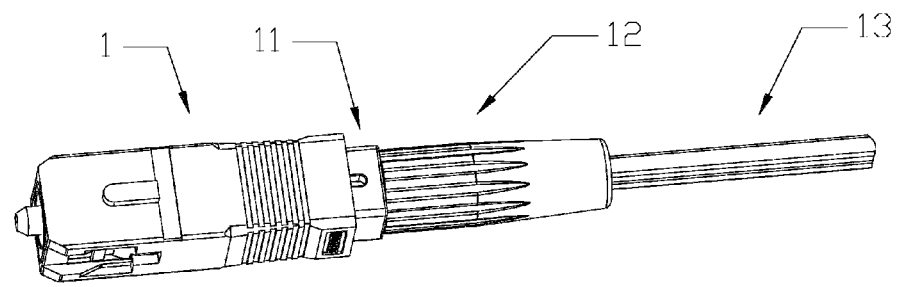
FIG. 15 is a schematic view of the assembled optical-fiber connector.

What is shown in FIGS. 1, 2 and 15 is a preferred example of the field installable optical-fiber connector of the present invention, which comprises a shell 1, a frame sleeve 2, a spring 3, a stop seat 4, an optical-fiber ferrule 5, a connecting optical-fiber 6, an optical-fiber splice sleeve 7, a first half 8 and a second half 9 of an optical-fiber splice member, a splice member clamp 10, and a seat body 11 and a tail sleeve 12 of a fixed tailstock. For describing this example in detail, the drawings further include a field optical cable 13; the field optical-fiber 131 of the field optical cable 13 has a glass optical-fiber with a diameter about 125 μm, which is coated around with one or more coatings having different diameters ranging from 245 μm to 900 μm; the field optical cable 13 can have dimensions of various specification, such as 2 mm×3 mm, and a diameter from about 2 mm to 3 mm.

Figure 3:
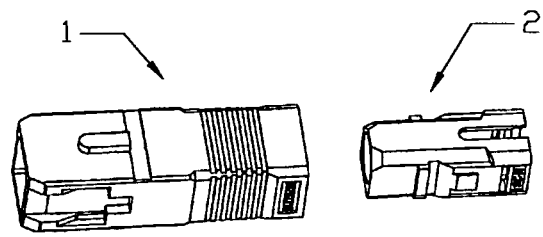
FIG. 3 is an exploded three-dimensional drawing of the shell and the frame sleeve.
Figure 4:
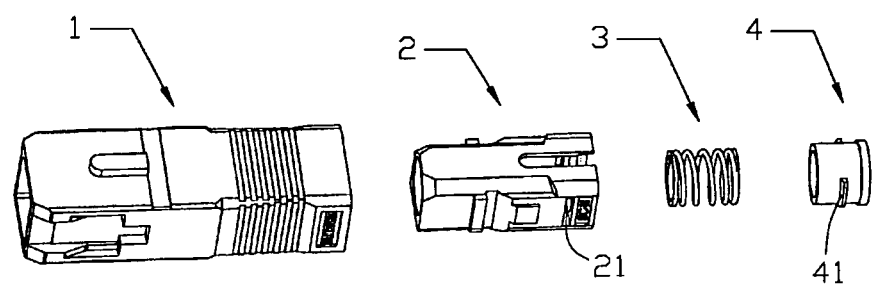
FIG. 4 is an exploded three-dimensional drawing of the shell, the frame sleeve, the spring and the stop seat.
Figure 5:
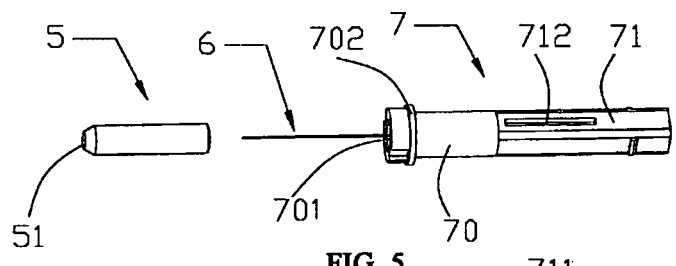
FIG. 5 is an exploded three-dimensional drawing of the optical-fiber ferrule and the optical-fiber splice sleeve.
Figure 6:
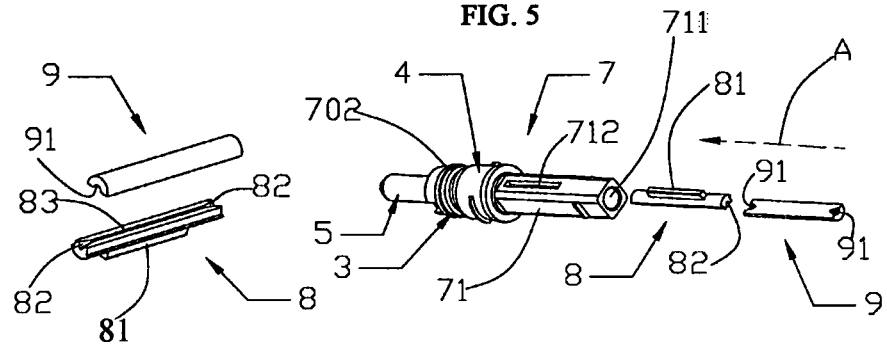
FIG. 6 is an exploded three-dimensional drawing of the optical-fiber splice member.
Figure 7:
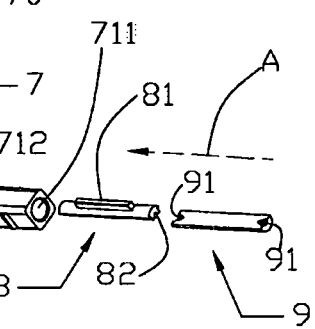
FIG. 7 is a schematic view of the optical-fiber splice member that is installed into the optical-fiber splice sleeve.

As shown in FIG. 3, the shell 1 and the frame sleeve 2 of the present invention are used for matching with a common optical-fiber adaptor; it shall be known that an SC optical-fiber connector is used here as an example for elaborating the present invention, but should not be comprehended as a restriction of the present invention, the present invention being equally applicable to an FC type, an LC type, an ST type and other types of optical-fiber adaptors.

As shown in FIGS. 1, 2 and 4-7, with the optical-fiber splice portion critical to the present invention, the optical-fiber splice sleeve 7 includes a segment of cylinder 70 and a segment of quadrangular prism 71 integrally connected with each other; the quadrangular prism 71 is provided inside with an optical-fiber splice member containing-chamber 711, and provided at one of its sides with a locking slot 712 running through the side where it is located and the inner surface of the optical-fiber splice member containing-chamber 711; the optical-fiber splice sleeve 7 is provided at its end opposite to the quadrangular prism 71, i.e. the end face of the cylinder 70, with a hole for optical-fiber ferrule 701, which communicates with the optical-fiber splice member containing-chamber 711 through an optical-fiber channel 703; the optical-fiber channel 703 is a tapered hole, and can play a guiding role for the connecting optical-fiber 6.

The optical-fiber splice member, located inside the optical-fiber splice member containing-chamber 711, includes a first half 8 or a second half 9 opposite to each other; the first half 8 is provided with a longitudinally extending optical-fiber splice groove 83, which is a V-shaped groove and can just accommodate the optical fiber having a diameter about 125 μm; for facilitating entry of the optical fiber into the optical-fiber splice groove 83, the optical-fiber splice groove 83 is provided at both ends with a guide slope, and the second half 9 is also provided at the corresponding position with a guide slope 91; when the first half 8 and the second half 9 are put together, the guide slope 82 and the guide slope 91 form a substantially trumpet-shaped opening, which has a certain guiding function for entry of the optical fiber into the optical-fiber splice groove 83; for facilitating introduction of the optical fiber into the optical-fiber splice groove 83, the first half 8 is further provided with a rib 81 matched with the locking slot 712 and protruding from the side where the locking slot 712 is located; the rib 81 can also be provided on the second half 9. The first half 8 and the second half 9 of the optical-fiber connector can be made of engineering plastics, and are not limited to such materials as quartz and $SiO_2$.

The optical-fiber ferrule 5 can be made of ceramics (zirconium oxide) materials, and is provided in the middle with a hole having a diameter from about 125 μm to 126 μm for receiving the connecting optical-fiber 6, which is pre-adhered inside the inner hole of the optical-fiber ferrule 5; the end face 51 of the optical-fiber ferrule 5 is ground, and can be spherical or angular spherical. The optical-fiber ferrule 5 pre-provided with the connecting optical-fiber 6 is inserted in the hole for optical-fiber ferrule 701, the connecting optical-fiber 6 being located at one end inside the optical-fiber ferrule 5 and at the other end into the optical-fiber splice groove 83 of the first half 8 of the optical-fiber splice member through the optical-fiber channel 703, the field optical-fiber 131 entering the optical-fiber splice groove 83 from an opposite direction to be butt jointed with the connecting optical-fiber.

When the first half 8 and the second half 9 of the optical-fiber splice member are placed in the optical-fiber splice member containing-chamber 711, the first half 8 is first placed into the optical-fiber splice member containing-chamber 711 along the direction as shown by the arrow A, ensuring that the rib 81 on the first half 8 is just put into the locking slot 712 on the quadrangular prism 71 of the optical-fiber splice sleeve 7, then the piece second half 9 of the optical-fiber splice member is inserted into the optical-fiber splice member containing-chamber 711 along the same direction.

Figures 8, 9:
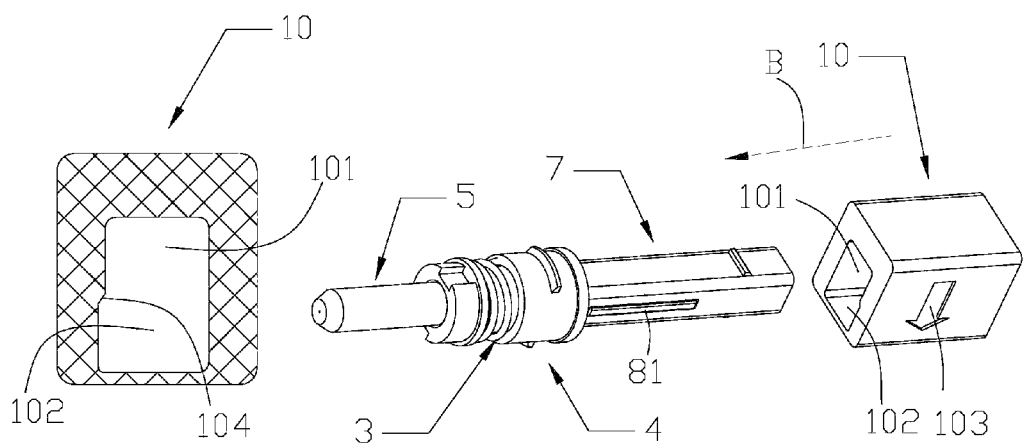
FIG. 8 is a sectional view of the optical-fiber splice member clamp.
FIG. 9 is a schematic view of the optical-fiber splice member clamp that is assembled with the optical-fiber splice sleeve.

As shown in FIGS. 8 and 9, FIG. 8 is a cross sectional view of the optical-fiber splice member clamp 10, which is used for clamping or loosing the first half 8 and the second half 9 of the optical-fiber splice member; the optical-fiber splice member clamp 10 is provided with a longitudinally extending locking channel including an upper part 101 and a lower part 102 parallel to each other, the lower part 102 being wider than the upper part 101, the upper part 101 and the lower part 102 keeping flush at one side, a transition slope 104 being provided between the opposite sides; the optical-fiber splice member clamp 10 is sleeved on the quadrangular prism 71 of the optical-fiber splice sleeve 7 along the direction as shown by the arrow B, and the quadrangular prism 71 can slide along the transition slope from the lower part 102 of the locking channel to the upper part 101.

Figures 10, 11:
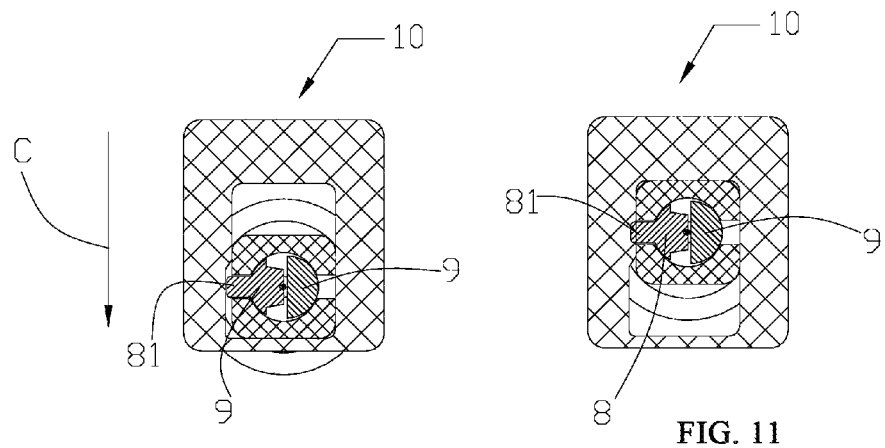
FIG. 10 is a sectional view of the optical-fiber connector in the open state.
FIG. 11 is a sectional view of the optical-fiber connector in the closed state.
Figure 12:
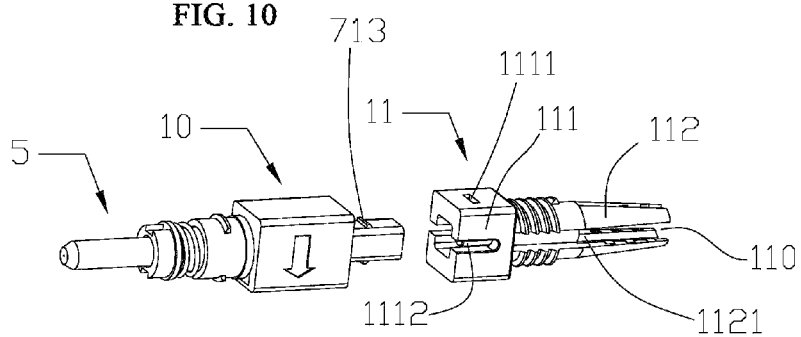
FIG. 12 is a schematic view of the fixed tailstock assembled with the optical-fiber splice sleeve.

It will be described below in detail how to clamp and loose the optical-fiber splice member with the optical-fiber splice member clamp 10 with reference to FIGS. 10 and 11. When the field optical-fiber 131 of the field optical cable 13 enters the optical-fiber splice groove 83, the first half 8 and the second half 9 of the optical-fiber splice member are in the open state, as shown in FIG. 10; here the quadrangular prism 7 is located at the lower part 102 of the locking channel of the optical-fiber splice member clamp 10, and there is a certain gap between the first half 8 and the second half 9 of the optical-fiber splice member, which can just make the field optical-fiber 131 enter the optical-fiber splice groove 83 on the first half 8; the guide slope 82 on the first half 8 and the guide slope 91 on the second half 9 play a guiding role when the field optical-fiber 131 enters the optical-fiber splice groove 83, enabling the field optical-fiber 131 to enter smoothly. When the field optical-fiber 131 enters the optical-fiber splice groove 83 and arrives at the position where it is to be butt jointed with the connecting optical-fiber 6, the optical-fiber splice member 10 is pressed along the direction as shown by the arrow C in FIG. 10, making the quadrangular prism 71 slide along the transition slope 104 from the lower part 102 of the locking channel to the upper part 101, as shown in FIG. 11; because the upper part 101 is narrower than the lower part 102, the inner wall of the upper part 101 of the locking channel squeezes the rib 81 on the first half 8 of the optical-fiber splice member, compressing the first half 8 and the second half 9 tightly together, and the connecting optical-fiber 6 and the field optical-fiber 131 are clamped inside the optical-fiber splice groove 83 on the first half 8, making the optical-fiber splice member in the closed state. For facilitating recognition of the press direction, the optical-fiber splice member clamp 10 is provided with an indicating arrow 103. The process of loosing the optical-fiber splice member, contrary to the above process, is done by simply pressing the optical-fiber splice member clamp 10 in the contrary direction, which will no longer be described.

The optical-fiber splice sleeve 7, the optical-fiber splice member and the optical-fiber splice sleeve can be installed in various optical-fiber connectors to form various field installable optical-fiber connectors, this example showing an SC-type optical-fiber connector.

In this example as shown in FIGS. 1, 2, 4 and 7, the frame sleeve 2 is detachably connected with the optical-fiber splice sleeve 7, and an elastic component is provided between the frame sleeve 2 and the optical-fiber splice sleeve 7, so as to ensure a certain elastic adjustment space for matching with the adaptor. In this example as shown in the drawings, the optical-fiber splice sleeve 7 is provided at its cylinder 70 with a spring seat 702, the spring 3 is sleeved on the cylinder 70, the stop seat 4 is sleeved on the cylinder 70 to limit the spring 3 between the spring seat 702 and the stop seat 4, and the stop seat 4 is clipped inside the frame sleeve 2 to fix the optical-fiber splice sleeve in the frame sleeve 2. The stop seat 4 is provided with two symmetrical upside-down buckles 41, and the frame sleeve 2 is provided with a buckle 21 (square hole) matched with the upside-down buckle 41. The shell 1 is sleeved outside the frame sleeve 2 and covers the optical-fiber splice member clamp 10, protecting the internal modules of the optical-fiber connector, preventing the matching of the optical-fiber splice member clamp 10 with the optical-fiber splice member from being loosen because of mistakenly touching the optical-fiber splice member clamp 10.

As shown in FIGS. 1, 2 and 12-14, the optical-fiber splice sleeve 7 is detachably connected with the fixed tailstock for fixing the field optical cable 13, this optical-fiber fixed tailstock including a seat body 11 and a tail sleeve 12. The seat body 11 is provided with an optical-cable channel 110 for connecting and fixing the field optical cable 13, and includes a splice portion 111 detachably connected with the optical-fiber splice sleeve 7 and a tapered portion 112 provided with a compressed opening 1121 for clamping the field optical cable 13; the tapered portion 112 compresses and clamps the field optical cable 13 when the tail sleeve 12 is sleeved on the tapered portion 112. For better clamping the field optical cable 13, the optical cable channel 110 is provided at its inner wall with a projection 1101, which can better clamp the field optical cable 13 when the optical cable channel 110 is compressed. The splice portion 111 is detachably connected with the optical-fiber splice sleeve 7; the optical-fiber splice sleeve 7 is provided with an upside-down buckle 713, and the splice portion 111 is provided with a buckle 1111 (square hole) matched with the upside-down buckle 713. The tail sleeve 12 is connected with the seat body 11 by threaded connection in this example, and actually can also be connected by other methods such as pressing and clipping. The seat body 11 can position the optical-fiber splice member clamp 10 in the axial direction; the splice portion 111 further includes a positioning column 1113, which can position the first half 8 and the second half 9 of the optical-fiber splice member in the axial direction, preventing the half 8 and the second half 9 from slipping out of the optical-fiber splice member containing-chamber 711.

Figure 13:
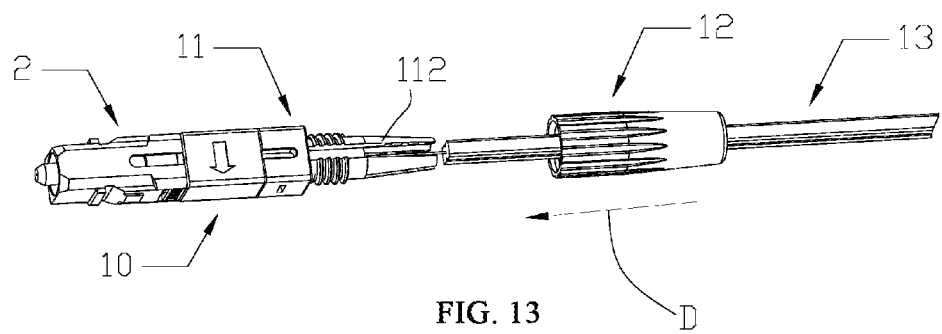
FIG. 13 is a schematic view of fixing the field optical cable.
Figure 14:
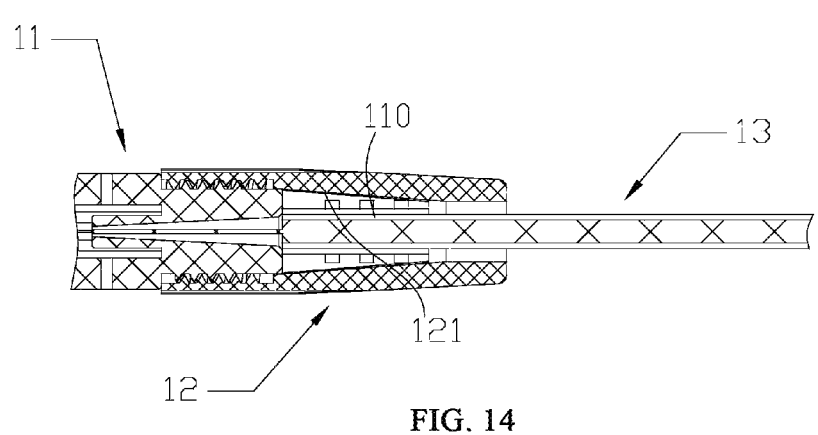
FIG. 14 is a partial sectional view of the assembled optical-fiber connector.

FIG. 13 is a schematic view of installing the field optical cable 13. The field optical cable 13 is treated in advance, making the field optical-fiber 131 stripped for mechanical cutting. The field optical cable 13 is inserted along the direction as shown by the arrow D, making the field optical-fiber 131 inserted into the optical-fiber splice groove 83 of the optical-fiber splice member and butt jointed with the connecting optical-fiber 6 pre-provided therein; meanwhile the field optical cable 13 is fixed inside the optical cable channel 110 on the seat body 11; for ensuring the field optical-fiber 131 to be butt jointed with the connecting optical-fiber 6 sufficiently, the field optical-fiber 131 inserted is slightly longer than as required actually, making the field optical-fiber 131 slightly curved against forward. Finally the tail sleeve 12 is installed along the direction as shown by the arrow, and the tail sleeve 12 is provided with a conic surface 121 that matches with the tapered portion 112 on the seat body 11, thus attaining the purpose of compressing tightly the field optical cable 13.

For solving the non-vertical and mirror effects when the end face of the optical fiber is cut so as to ensure efficient coupling of the optical fiber, the refractive index matching gel can be injected into the optical-fiber splice groove 83.

FIG. 15 is a schematic view of the assembled optical-fiber connector.

The optical-fiber connector of the present invention can be repeatedly disassembled. While disassembling, the optical-fiber connector is first withdrawn from the shell 01 and then from the tail sleeve 12, then the optical-fiber splice member clamp 10 is pushed along the direction contrary to the arrow 103 on the optical-fiber splice member clamp 10 to loose the optical-fiber splice member, and finally the field optical cable 13 is pulled out. The disassembled optical-fiber connector can be repeatedly assembled for use.

Because the optical-fiber splice member clamp of the present invention has been placed into the connector, the optical-fiber connector allows rapid field assembly and disassembly without a field installation tool.

The examples of the present invention have been described with reference to the drawings. However, the present invention is not limited to the above specific embodiments, which are only exemplary rather than restrictive. Those of ordinary skill in the art, under the inspiration of the present invention and without departing from the purposes of the present invention and the scope of protection of the claims, can also make many forms of alteration, which are all within the scope of protection of the present invention.

What is claimed is:

1. A field installable optical-fiber connector, characterized in that: it at least comprises:
   an optical-fiber splice sleeve, having a segment of quadrangular prism provided inside with an optical-fiber splice member containing-chamber, the quadrangular prism being provided at one of its sides with a locking slot running through the side where it is located and the inner surface of the optical-fiber splice member containing-chamber, the optical-fiber splice sleeve being provided at its end opposite to the quadrangular prism with a hole for optical-fiber ferrule, an optical-fiber channel being provided between the hole for optical-fiber ferrule and the optical-fiber splice member containing-chamber;
   an optical-fiber splice member, placed in the optical-fiber splice member containing-chamber, including a first half or a second half opposite to each other, the first half being provided with a longitudinal optical-fiber splice groove, the first half or the second half being provided with a rib which is matched with and protrudes from the locking slot;
   an optical-fiber ferrule, inserted in the hole for optical-fiber ferrule and pre-provided inside with a connecting optical-fiber, the connecting optical-fiber being located at one end inside the optical-fiber ferrule and at the other end into the optical-fiber splice groove through the optical-fiber channel, the field optical-fiber entering the optical-fiber splice groove from an opposite direction to be butt jointed with the connecting optical-fiber; and
   an optical-fiber splice member clamp, sleeved on the quadrangular prism, provided with a longitudinally extending locking channel including an upper part and a lower part parallel to each other, the lower part being wider than the upper part, an inner wall of the locking channel pressing the rib so that the connecting optical-fiber and the field optical-fiber are kept by the first half and the second half in the optical-fiber splice groove when the quadrangular prism is moved from the lower part to the upper part of the channel.

2. The field installable optical-fiber connector according to claim 1, characterized in that: the optical-fiber splice groove are provided at both ends with a guide slope, and the second half is provided with another guide slope at a position corresponding to the guide slope.

3. The field installable optical-fiber connector to claim 1, characterized in that: the connector further includes a fixed tailstock detachably connected with the optical-fiber splice sleeve and used for fixing a field optical cable.

4. The field installable optical-fiber connector according to claim 3, characterized in that: the fixed tailstock includes a seat body and a tail sleeve, the seat body being provided with an optical-cable channel for connecting and fixing the field optical cable and with a splice portion detachably connected with the optical-fiber splice sleeve and a tapered portion provided with a compressed opening for clamping the field optical cable, the tapered portion compressed and clamping the field optical cable when the tail sleeve is sleeved on the tapered portion.

5. The field installable optical-fiber connector according to claim 4, characterized in that: the optical cable channel of the tapered portion is provided on its inner surface with a projection used for clamping the field optical cable.

6. The field installable optical-fiber connector according to claim 4, characterized in that: the optical-fiber splice sleeve is provided with an upside-down buckle, and the splice portion of the seat body has a buckle matched with the upside-down buckle.

7. The field installable optical-fiber connector according to claim 1, characterized in that: the optical-fiber connector further includes a frame sleeve detachably connected with the optical-fiber splice sleeve, and an elastic module is provided between the frame sleeve and the optical-fiber splice sleeve.

8. The field installable optical-fiber connector according to claim 7, characterized in that: the elastic module includes a spring and a stop seat, the spring being sleeved on the optical-fiber splice sleeve provided with a spring seat matched with the spring, the stop seat being sleeved on the optical-fiber splice sleeve to limit the spring between the spring seat and the stop seat, the stop seat being clipped inside the frame sleeve to fix the optical-fiber splice sleeve inside the frame sleeve.

9. The field installable optical-fiber connector according to claim 8, characterized in that: the stop seat is provided with an upside-down buckle, and the frame sleeve is provided with a buckle matched with the upside-down buckle.

10. The field installable optical-fiber connector according to claim 7, characterized in that: the optical-fiber connector further includes a shell, which covers the frame sleeve and the optical-fiber splice member clamp.

11. The field installable optical-fiber connector according to claim 2, characterized in that: the connector further includes a fixed tailstock detachably connected with the optical-fiber splice sleeve and used for fixing a field optical cable.

12. The field installable optical-fiber connector according to claim 2, characterized in that: the optical-fiber connector further includes a frame sleeve detachably connected with the optical-fiber splice sleeve, and an elastic module is provided between the frame sleeve and the optical-fiber splice sleeve.

* * * * *